United States Patent [19]

Nanasawa et al.

[11] Patent Number: 5,254,622
[45] Date of Patent: Oct. 19, 1993

[54] ABS RESIN COMPOSITIONS AND MOLDED ARTICLES THEREOF HAVING IMPROVED COATING PERFORMANCES

[75] Inventors: Atsushi Nanasawa; Noriaki Umeda, both of Kurashiki, Japan

[73] Assignee: Asahi Kasei Kogyo Kabushiki Kaisha, Osaka, Japan

[21] Appl. No.: 799,878

[22] Filed: Nov. 27, 1991

Related U.S. Application Data

[63] Continuation of Ser. No. 447,811, Dec. 8, 1989, abandoned.

[30] Foreign Application Priority Data

Dec. 9, 1988 [JP] Japan .................... 63-310058
Mar. 22, 1989 [JP] Japan .................... 1-067675

[51] Int. Cl.$^5$ ............. C08L 55/02; C08L 33/20; C08L 35/06; C08L 33/08
[52] U.S. Cl. .................................... 525/80; 525/85; 525/83; 525/84; 525/310; 525/316
[58] Field of Search .............. 525/83, 80, 84, 310, 525/316, 85

[56] References Cited

U.S. PATENT DOCUMENTS

| | | | |
|---|---|---|---|
| 3,763,278 | 10/1973 | Griffith | 525/310 |
| 3,928,494 | 12/1976 | Aliberti | 525/310 |
| 4,002,811 | 1/1977 | Hendy | 525/316 |
| 4,064,116 | 12/1977 | Papetti | 525/316 |
| 4,102,947 | 7/1978 | Budinger et al. | 525/316 |
| 4,154,777 | 5/1979 | Shoji et al. | 525/310 |
| 4,287,316 | 9/1981 | Kanecko et al. | 525/310 |
| 4,366,281 | 12/1982 | Abe et al. | 525/84 |
| 4,598,124 | 7/1986 | Aliberti et al. | 525/316 |
| 4,652,615 | 3/1987 | Hoen | 525/80 |
| 4,788,250 | 11/1988 | Kitahara et al. | 525/80 |

FOREIGN PATENT DOCUMENTS 009655 12/1983 European Pat. Off. .
60-051704 3/1985 Japan .
61-197612 9/1986 Japan .

OTHER PUBLICATIONS

Abstract of Japanese Patent 79-094547, Jul. 1979.

Primary Examiner—James J. Seidleck
Assistant Examiner—W. R. H. Clark
Attorney, Agent, or Firm—Birch, Stewart, Kolasch & Birch

[57] ABSTRACT

A resin composition comprising a graft copolymer of a rubbery polymer having a vinyl cyanide compound and an aromatic vinyl compound grafted thereon, and a copolymer comprising a vinyl cyanide compound and an aromatic vinyl compound. A molded article of the resin composition is characterized with improved coating performances.

17 Claims, 2 Drawing Sheets

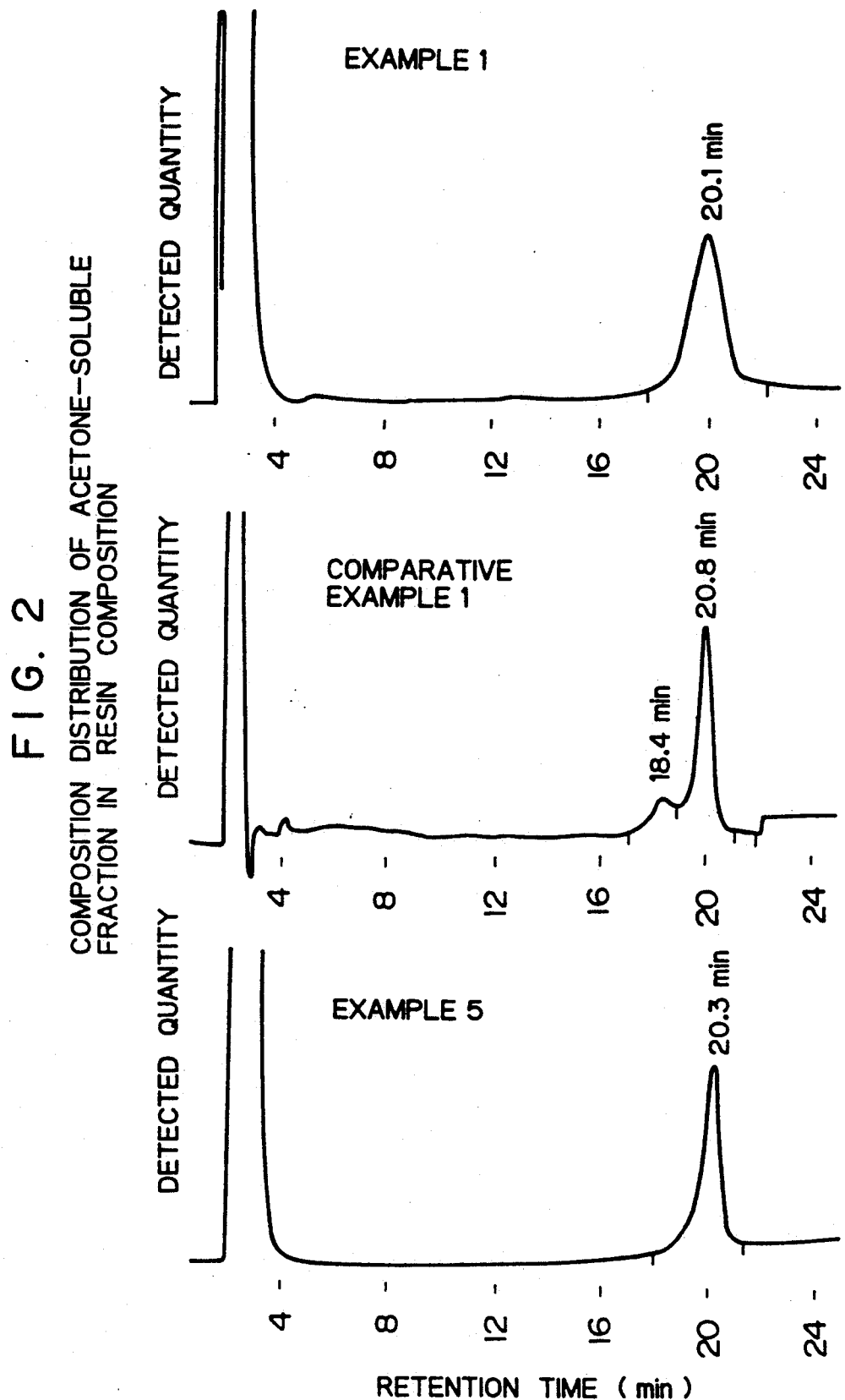

ABS RESIN COMPOSITIONS AND MOLDED ARTICLES THEREOF HAVING IMPROVED COATING PERFORMANCES

This application is a continuation of application Ser. No. 07/447,811, filed on Dec. 8, 1989, now abandoned.

BACKGROUND OF THE INVENTION

1. Field of the Invention

This invention relates to a resin composition having excellent appearance and coating performances.

2. Related Art

Resin compositions prepared by graft copolymerizing a rubbery polymer with a vinyl cyanide compound and an aromatic vinyl compound, for example, an ABS resin, are widely used because of their excellent processability and mechanical strengths. However, when a polymer of a diene compound is used as the rubbery polymer of a resin composition, this type of resin composition is characterized with being insufficient in weather resistance, and therefore a product of the resin composition must sometimes be coated. Further, it is often coated for designing reasons.

If a molded resin article is coated with a coating material, small cracks can be formed on the surface of the molded resin article when it is contacted with the coating material or thinner, particularly when the coating material and the thinner are not appropriate or the conditions of coating work is not appropriate, for the article to be coated. Such cracks can absorb the coating material and, even if absorption of the coating material does not take place, the gloss vividness of the coating surface is deteriorated. When a coated resin article having such an inferior appearance is used next to a coated metallic article as in the case of interior and exterior coated parts of automobiles and motorcycles, the commercial value of the whole article is deteriorated.

It has been determined that the defective appearance of coated resin articles is attributable to the residual strain remaining in the molded resin. Accordingly, this phenomenon can be eliminated by annealing the molded article before it is coated. However, the annealing of large-sized articles requires large equipment, and increases the number of working steps which greatly deteriorates the productivity. Although coating materials and thinners which do not permeating the molded resins may be usable, their use is generally undesirable because a coating film produced therefrom is low in adhesive strength.

An attempt to solve the problem of defective appearance of coated resin article by the technique of improving the resin composition, can be referred to in Japanese Patent Application Kokai (Laid-Open) No. 54-94547. According to this technique, there is provided a resin composition prepared by compounding a rubbery polymer/vinyl cyanide compound/aromatic vinyl compound copolymer wherein the content of vinyl cyanide compound which is chemically grafted onto a rubbery polymer is 32 to 37% by weight, with a vinyl cyanide compound/aromatic vinyl compound copolymer wherein the content of vinyl cyanide compound is 20 to 37% by weight; and the content of vinyl cyanide compound in the total free polymer is adjusted to 22 to 35% by weight. In this technique, the content of the vinyl cyanide compound graft is made higher than the conventional content (25 to 30% by weight other than rubbery polymer component) of the vinyl cyanide compound in the components of general ABS resin, and thereby a high chemical resistance is given to the resin composition, the stress crack at the time of coating is prevented, and the absorption of the coating material is avoided. However, this technique wherein only the grafted chain is taken into consideration is disadvantageous in that the impact resistance of the resin composition is impractically deteriorated if the content of the vinyl cyanide compound is increased in order to additionally improve the coating performances.

In Japanese Patent Publication No. 63-30953, there is disclosed a technique which comprises using a general ABS resin in mixture with a vinyl cyanide compound/aromatic vinyl compound copolymer in which the vinyl cyanide compound content is as high as 38 to 65% by weight. According to this technique, however, the impact resistance property of the resin composition and its flow property during processing are impractically deteriorated if the content of vinyl cyanide compound is additionally increased in order to improve the coating performances.

In other words, none of the prior techniques has been capable of providing an ABS resin which exhibits good impact resistance and flow property during processing in addition to providing satisfactory coating performances.

SUMMARY OF THE INVENTION

The present inventors conducted many studies with the object being to obtain a resin composition exhibiting no stress crack and absorption of coating material during coating even if its molded article has not been subjected to annealing, and having a high gloss vividness of coating surface, excellent coating performances, a sufficient flow property during processing and a high impact resistance property. As a result, it was found that object cannot be achieved satisfactorily by merely increasing the content of the vinyl cyanide compound in either the graft copolymer or the free copolymer, and that only a resin composition having a specified composition and a specified composition distribution can achieve the required coating performances, impact resistance and flow property characterizations during processing. It was also found that the increase in the water-absorbing tendency of resin composition due to the increased content of vinyl cyanide compound and the insufficiency in moldability due to water absorption of resin, can be controlled by making the sum quantity of sodium and potassium remaining in the resin composition lower than a specified value. Based on these findings, the present invention was accomplished.

BRIEF DESCRIPTION OF DRAWINGS

FIG. 2 is a liquid chromatographic chart illustrating the composition distribution of the acetone-soluble fraction in the resin composition.

DETAILED DESCRIPTION OF PREFERRED EMBODIMENTS

Figure 1:
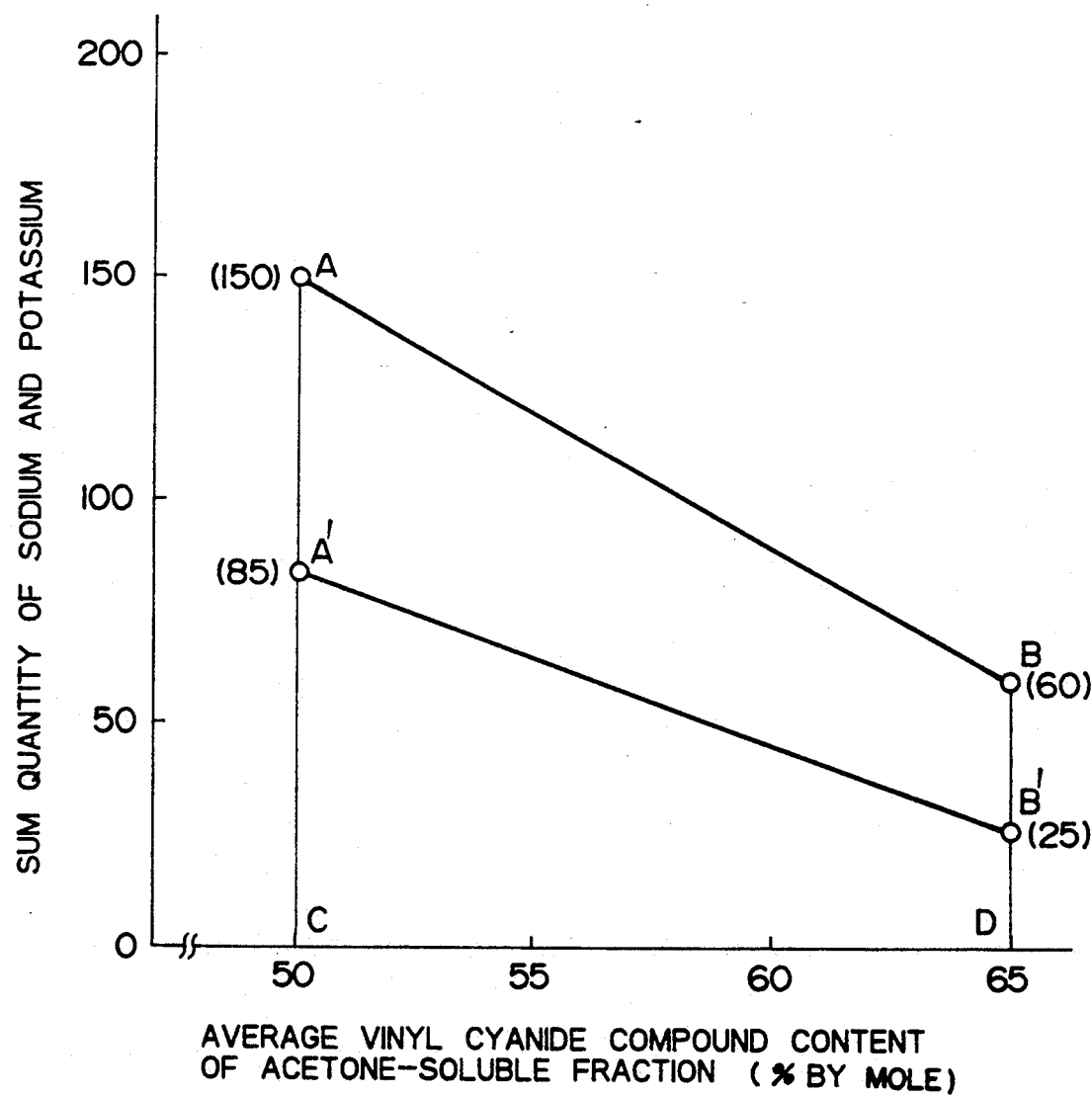
FIG. 1 is a graph illustrating the relation between sum quantity of sodium and potassium and average content of the vinyl cyanide compound in the acetone-soluble fraction (% by mole)

According to this invention there is provided a resin composition comprising graft copolymer (I) prepared by graft-copolymerizing a vinyl cyanide compound (A) and an aromatic vinyl compound (S) onto a rubbery polymer (B) and copolymer (II) prepared by copolymerizing a vinyl cyanide compound (A) and an aromatic vinyl compound (S). In this invention, a resin composition having the following characteristic features is used in coatings:

(i) content of (B) in the resin composition is 5 to 50% by weight;

(ii) the average content (M) of vinyl cyanide compound in acetone-soluble resin component (P) of the resin composition is 50 to 65% by mole;

(iii) (M) of (I) is substantially equal to the average vinyl cyanide compound unit content of (II); and (iv) in a distribution curve, at least 70% by weight of (P) exists in the range of (M) ±2.5% by mole.

For some uses, a part of the aromatic vinyl compound unit may be replaced with an acrylic ester or a methacrylic ester.

In order to avoid the defective moldability due to water absorption of resin composition, the sum quantity of sodium and potassium remaining in resin composition is preferably 150 ppm or less when the average content of vinyl cyanide compound unit (M) is 50% by mole and 60 ppm or less when (M) is 65% by mole, and it is preferably in the area ABCD in FIG. 1.

Hereinafter, this invention will be explained in more detail.

As is well known, chemical resistance of ABS resin becomes improved as the content of vinyl cyanide compound unit increases in graft copolymer (I) prepared by graft-copolymerizing vinyl cyanide compound (A) and aromatic vinyl compound (S) onto the rubbery polymer or in copolymer (II) prepared by copolymerizing vinyl cyanide compound and aromatic vinyl compound. Further, as pointed out in the prior literature, the defective appearance produced during coating can be avoided to some extent by improving the chemical resistance property.

On the other hand, it is known that an increase in the content of the vinyl cyanide compound unit deteriorates flow property during processing and the impact resistance property of the resin composition. If a molded article is produced from a resin composition which is poor in flow property, it is likely to contain residual strain, so that cracks are formed when contacted with a coating material and thinner, which results in deteriorating its appearance. Further, doubtlessly, a resin composition having a low impact resistance is not useful industrially. Thus, the important point in the technique of ABS resin for use in coatings has consisted of being able to increase the content of vinyl cyanide compound to the extent that it can be increased without deteriorating the flow proper and impact resistance. The prior art is based on the technical idea that chemical resistance can be assured by increasing the content of vinyl cyanide compound in one of (I) and (II) and flow property and impact resistance can be maintained, by keeping the vinyl cyanide compound content in the other of (I) and (II), on a relatively low level.

In such a technique, however, the existence of the component having a lower vinyl cyanide compound content deteriorates the chemical resistance, so that coating performances of the resin composition are unsatisfactory. According to the prior art, coating performances have been contradictory to flow property and impact resistance, and it has been difficult to fulfill both requirements simultaneously.

The present inventors conducted many studies with the object being to provide a resin composition having a high content of vinyl cyanide compound and being excellent in coating performances without deteriorating the flow property during processing and the impact resistance property. As the result, this invention was accomplished. The findings of the present inventors that A and S components of graft copolymer (I) must be substantially equal to copolymer (II) in terms of the average content of the vinyl cyanide compound unit and that acetone-sluble resin fraction (P) of resin composition must have a sharp composition distribution, have been unexpectable from prior art. Owing to this discovery, it has become possible for the first time to provide an ABS resin having an average content of vinyl cyanide compound (M) as high as 50 to 65% by mole (33.8 to 48.6% by weight) on a practical level of 40 to 46% by mol.

The term "coating performances" referred to in this invention means that, when the molded article of the resin is contacted with a coating material and thinner, no stress crack is formed and the absorption of the coating material does not occur and the coating surface has a high gloss vividness of mirror image (hereinafter simply referred to as gloss vividness) and its appearance is comparable to that of a coated steel plate. At the same time, since the flow property during processing is as high as that of conventional ABS resins, the weld line of injection molding is shallow and imperceptible. Further, since the addition of a large quantity of plasticizer (low molecular weight compound) for improving flow property is unnecessary, no repelling of the coating material and no defective adhesion occur. The term "coating performances" means these performances inclusively.

(a) Next, the average content of vinyl cyanide compound unit and composition distribution will be explained.

In the resin composition of this invention, (M), i.e. average content of vinyl cyanide compound unit in the acetone-soluble resin component (P), is 50 to 65% by mole, preferably 53 to 60% by mole, and more preferably 55 to 58% by mole. If (M) is smaller than 50% by mole, absorption of the coating material readily coating. If (M) is greater than 65% by mole, the flow property during processing is deteriorated.

The AS component of graft copolymer (I) constituting the resin composition must be substantially equal to copolymer (II) in (M). The allowable range of (M) is at most 5% by mole, as expressed in terms of difference between average content of the vinyl cyanide compound unit in the AS component of graft copolymer (I) and the average content of vinyl cyanide compound unit in copolymer (II). If this difference is greater than this allowable range, the dispersion of graft copolymer (I) in copolymer (II) will not be uniform, and the impact resistance property would be deteriorated.

The shape of the composition distribution curve of acetone-soluble fraction (P) of resin composition has an important meaning. At least 70% by weight, preferably at least 75% by weight, and particularly at least 80% by weight of (P) must have an (M) value falling within the range of (M) ±2.5% by mole. A resin composition having a broad composition distribution prepared by compounding a copolymer (II) having a low vinyl cyanide compound unit content with a copolymer (II) having a high vinyl cyanide compound unit content, is inferior to a resin composition having a sharp composition distribution in coating performances and particularly in gloss vividness of coating surface, even though the two resin compositions may be equal to each other in terms of (M).

The composition distribution of acetone-soluble fraction (P) can be analyzed according to the known method mentioned in Acta Polymerica, 33, 614 (1982), Macromolecules 17, 962 (1984), etc. In this specification, the composition distribution of (P) is determined by measuring the peak area in chromatogram and converting it to "% by weight".

Also, the composition distribution can be determined by periodically sampling the content of the polymerization reactor, quantitatively analyzing the free monomers present therein and calculating the copolymer composition by referring to the mass balance between the initially fed monomers and the remaining monomers. The analytical result obtained by the latter method well coincides with the analytical result obtained by the former method (liquid chromatography). The latter method is effectively usable when a terpolymer to which liquid chromatography cannot easily be applied is used as copolymer (II).

(b) Next, the method for producing a resin composition having a sharp composition distribution will be explained.

In producing the resin composition of this invention, the composition ratio between vinyl cyanide compound and aromatic vinyl compound to be reacted is in a range where the concentration of vinyl cyanide is higher than the azeotropic mixture of the two monomers. Accordingly, if the total monomer mixture is reacted by a simple batch procedure, the copolymer formed just after the start of the polymerization is different from the copolymer formed in the later stages of the polymerization in terms of the content of the vinyl cyanide compound unit, and the resulting total copolymer cannot have a sharp composition distribution.

When the copolymerization is carried out batch-wise, it is preferable to continuously add a monomer mixture into the reaction system so that the added monomer mixture can be rapidly consumed. In general, it is preferable to maintain a polymerization rate of 90%, more preferably 93% or more, during at least ⅔ period of the total addition time of the monomer mixture. For maintaining a high polymerization rate, known methods can be applied such as methods which adopt a long period of time for the addition of a monomer mixture, which use a large quantity of polymerization initiator, which adopt a high polymerization temperature, etc.

As another method for rendering the composition distribution sharp, there can be mentioned a method which comprises carrying out a graft copolymerization of high rubbery polymer content according to the abovementioned method and mixing the resulting polymer with a copolymer having no substantial composition distribution having been produced by a complete mixing type continuous polymerization process. This method can particularly effectively be carried out in the mode of solution polymerization, when the vinyl cyanide compound is acrylonitrile and the aromatic vinyl compound is styrene or when a part of the aromatic vinyl compound is replaced with acrylic ester or methacrylic ester.

When a copolymer formed by this method is mixed with the above-mentioned graft copolymer having a high rubbery polymer content obtained by a batch process, it is necessary to measure the content of the AS component of the graft copolymer and the content of the vinyl cyanide compound of the copolymer previously, and to combine the two copolymers so that the vinyl cyanide contents of the two copolymers coincide with each other as close as possible.

When alpha-methylstyrene is used as the aromatic vinyl compound, in many cases emulsion polymerization is adopted to limit the polymerization velocity. Since alpha-methylstyrene more readily forms an alternating structure, during than when styrene is used, copolymerization with a vinyl cyanide compound, the composition distribution of the resulting copolymer is likely to become broad if the content of vinyl cyanide compound is increased. To prepare a composition in which the composition distribution falls in the allowable range, the polymerization system used to prepare the composition must be kept in a state of high activity and the monomer mixture continuously added to the system must be consumed rapidly. At this time, a selection of the emulsifier plays an important role. Thus, it is preferable to use a mixed emulsifier consisting of 70 to 30% by weight of sodium or potassium rosinate and 30 to 70% by weight of sodium or potassium salt of alkenylsuccinic acid in an amount of 1.5 to 3.0 parts by weight per 100 parts by weight of the total monomer mixture. If sodium or potassium rosinate is used alone, the initiation of the polymerization is slow, so that a polymerization rate of 90% or above cannot be achieved during the time period of ⅔ or more of the total time period of monomer addition. If sodium or potassium salt of alkenylsuccinic acid is used alone, the viscosity of the polymerization system increases, so that in the later stages of the reaction, the polymerization rate decreases. If the amount of the mixed emulsifier is smaller than 1.5 parts, the initiation of polymerization is slow. If it exceeds 3.0 parts, the viscosity of the reaction system increases.

(c) Next, the types of the monomers used in the copolymerization and the molecular weights of the copolymers will be mentioned.

In the standard resin composition of this invention, acrylonitrile is used as the vinyl cyanide compound and styrene is used as the aromatic vinyl compound. When a good flow property is required of the resin composition during processing, a part of the aromatic vinyl compound can be replaced with an acrylic ester or methacrylic ester. As the ester monomer, butyl acrylate is preferable, with which 5 to 50% by weight and preferably 10 to 40% by weight of the aromatic vinyl compound can be replaced. If the amount of the ester monomer is smaller than 5% by weight, its use does not bring about a sufficient effect. If its amount is greater than 50% by weight, the heat resistance property is deteriorated.

When a high heat resistance property is required of the resin composition, alpha-methylstyrene can be used as the aromatic vinyl compound.

The molecular weight of the acetone-soluble fraction (P) of the resin composition may be designed in accordance with the strength and flow property required of the article. The molecular weight of the polymer is expressed by solution viscosity $\zeta sp/c$ (30° C., in methyl ethyl ketone solvent, concentration 0.5% by weight). When the article is produced by an injection molding process, it is 0.3 to 0.7 and preferably 0.35 to 0.6. When the article is produced by a blow molding process or sheet molding process, it is 0.4 to 1.0 and preferably 0.5 to 0.8.

The degree of grafting a copolymer onto a rubbery polymer, is defined by the following formula:

$$\text{Degree of grafting} = \left( \frac{\text{Weight of insoluble acetone fraction}}{\text{Weight of rubbery polymer}} - 1 \right) \times 100$$

This value is preferably 30 to 70%.

(d) Next, the rubbery polymer will be explained.

As the rubbery polymer, diene type rubbers such as polybutadiene, butadiene-styrene copolymer, butadieneacrylonitrile copolymer, polyisoprene, polychloroprene and the like, acrylic rubbers such as butyl acrylate-methyl methacrylate-(meth)acrylic ester copolymer and the like, and saturated rubbers such as ethylene-propylene copolymer rubber, hydrogenated polybutadiene, fluorinated rubber, silicone rubber and the like can be used.

The optimum particle diameter of the rubbery polymer varies depending on the composition of the monomer units constituting copolymer (II). When copolymer (II) is constituted of acrylonitrile-styrene copolymer and acrylonitrile-styrene-(meth)acrylic ester copolymer, preferable particle diameter is 0.2 to 0.4 micron. When copolymer (II) is acrylonitrile-alphamethylstyrene copolymer, preferable particle diameter is 0.1 to 0.2 micron.

The particle diameter of the rubbery polymer used in this invention can be determined from the electron microscopic photograph of the rubber latex used as the starting material.

The content of the rubbery polymer in the final resin composition is 5 to 50% by weight and preferably 10 to 30% by weight.

(e) Next, the allowable quantity of sodium and potassium remaining in the resin composition will be explained.

One of the characteristic features of the resin composition of this invention is that the content of vinyl cyanide compound unit of the ABS resin thereof, is higher than in conventional resins. Vinyl cyanide compounds are generally said to be hydrophilic, and copolymers prepared by copolymerizing these compounds are hygroscopic. If a resin having absorbed water is directly molded by means of heating, the vaporized water would form flash on the surface of molded article, which would in turn, form a marked die line, or would include air bubbles and thereby deteriorates the appearance and mechanical strength of article. Accordingly, conventional ABS resins are usually preliminarily dried with heat prior to molding. It was unexpected that the sum quantity of sodium and potassium in the resin composition plays an important role for bringing the resin composition of this invention into a state which is dry enough to prevent its molded article from having a defective appearance under the conventional drying conditions of ABS resin (80-90° C., 2-4 hours). The sodium and potassium originate from the emulsifier and polymerization initiator used in the emulsion polymerization process, and presumably they remain in the resin composition when they do not sufficiently react with the acid or inorganic electrolyte used in the salting-out step after the polymerization for the purpose of depositing the resulting polymer or when they are not sufficiently washed away in the washing step even though they have reacted with these chemicals. Although details of this phenomenon are yet unknown, the defective moldability due to insufficient dryness can be avoided by reducing the sum quantity of sodium and potassium.

The residual quantities of sodium and potassium can be measured by atomic absorptiometry.

The allowable limit of the sum quantity of sodium and potassium varies depending on the average content of vinyl cyanide compound unit (M) in copolymer (II). That is, when (M) is relatively small (50% by mole), the allowable sum quantity of sodium and potassium is 150 ppm or less and preferably 85 ppm or less while when (M) is greater (65% by mole) it is 60 ppm and preferably 25 ppm or less. This holds whether the aromatic vinyl compound is styrene or alphamethylstyrene or those partially replaced with acrylic ester or methacrylic ester. Allowable range and preferable range are shown in FIG. 1 as area ABCD and A'B'CD, respectively.

As a means for decreasing the quantity of sodium and potassium, the quantity of the emulsifier and the polymerization initiator containing sodium or potassium can be decreased and the salted out slurry can be sufficiently washed out. A preferable means is a method which comprises producing only a graft copolymer having a high rubbery polymer content by emulsion polymerization and blending the resulting polymer with a copolymer containing neither sodium nor potassium produced by solution polymerization.

Into the resin composition of this invention, known additives such as antioxidant, ultraviolet absorber, slipper, mold release agent, flame retardant, antistatic agent, colorant and the like may arbitrarily be added. Its reinforcement with glass fiber, carbon fiber or the like is also arbitrarily adoptable.

Next, this invention will be explained by way of the following non-limitative examples, wherein the term "parts" means "parts by weight".

1. Production of resin composition by one step polymerization

According to this method, copolymer (II) is produced at the time of producing graft copolymer (I). a-1: A polybutadiene rubber latex (weight average particle diameter 0.3 micron, solid rubber content 16 parts, deionized water content 100 parts, potassium rosinate content 1.0 part) is introduced into a polymerization reactor equipped with a reflux condenser. After replacing the gas phase with nitrogen gas, the temperature is elevated to 70° C. To the latex are continuously added (1) a monomer mixture consisting of 33.6 parts of acrylonitrile, 50.4 parts of styrene, 0.85 part of t-dodecylmercaptan and 0.1 part of cumeme hydroperoxide and (2) an aqueous solution prepared by dissolving 0.2 part of sodium formaldehyde sulfoxylate, 0.004 part of ferrous sulfate and 0.04 part of disodium salt of ethylenediaminetetraacetic acid in 50 parts of deionized water, and reacted over a period of 6 hours. During the reaction period, the temperature of the polymerization system is kept at 70° C. After the addition the resulting mixture is kept at a state of high activity for an additional hour to complete the reaction.

When 1.5 hours has passed from the initiation of the reaction, the polymerization rate is 90% or above. Thereafter, a high polymerization rate of 90% or above is maintained. The final polymerization rate is 93.4%.

The degree of grafting to the rubbery polymer is 54%. In (I)-1, it is confirmed that an acrylonitrile-styrene copolymer corresponding to copolymer (II) is also formed simultaneously with the grafting reaction yielding graft copolymer (I).

The copolymer latex thus obtained is diluted with deionized water so as to yield a solid component content of 10% and is heated to 80° C. Then, the latex is coagulated by adding 1.3 parts of magnesium sulfate per 100 parts of solid component. The coagulated product is centrifugally dehydrated to obtain a cake having a water content of 65%. The dehydrated cake is twice subjected to re-slurrying and washing treatments and dried by means of a hot air circulation type oven at 90° C. to obtain a dry flask. One hundred parts of the dry flake is mixed with 0.2 part of an antioxidant (BHT manufactured by Sumitomo Kagaku K. K.) and 0.5 part of a mold release agent (ethylene-bisstearylamide) and pelletized by means of an extruder.

The pellet thus obtained is injection molded at a cylinder temperature of 240° C. and a mold temperature of 45° C. to prepare dampbell test pieces according to ASTM D-638.

The test piece thus obtained is dipped in an acrylic coating solution (RECRACK® 55 manufactured by Fujikura Kasei K.K. : Nonblushing : 169 thinner = 50 : 15 : 35) for 20 seconds and dried at 80° C. for 30 minutes, after which formation of crack and absorption of coating solution are visually examined.

Further, a test piece is coated with an electroconductive coating material (electroconductive primer manufactured by Nippon Yushi K.K.) by means of a spray and thereafter coated with a urethane coating material (Hi Urethane® 5000 manufactured by Nippon Yushi K.K.) by means of a spray and dried at 75° C. for 20 minutes. Gloss vividness of the coating is measured by means of a mirror image meter (ICM-ID, manufactured by Suga Shikenki K.K., slit width 1 mm, reflexion angle 45°).

Composition distribution of the resin composition is measured by the following method.

Component (P) is extracted from the resin composition by the use of acetone, and is analyzed by liquid column chromatography using tetrahydrofuran and n-hexane as the developer, silica column (ZORBAX-CN manufactured by DuPont) as a column, UV (254 nm) as a detector and GE-LC-GII System manufactured by Shimazu K.K. as the apparatus.

Mechanical properties of the resin composition are measured according to standard.

a-2 to a-5: A polymerization is carried out in the same manner as in a-1, except that the composition of the monomer mixture and the amount of t-dodecylmercaptan are altered. After-treatment and analyses are carried out in the same manner as in a-1.

a-6: Twenty parts of a solid component of rubbery polymer is reacted with a monomer mixture consisting of 40 parts of acrylonitrile, 24 parts of styrene, 16 parts of butyl acrylate and 1.3 parts of t-dodecylmercaptan. After-treatment is carried out in the same manner as in a-1.

In order to know the composition distribution of polymerized product, the content of reactor is sampled out at intervals of 30 minutes, and composition and composition distribution of the formed polymer are determined based on the mass balance between the fed monomers and the monomers remaining in the system.

The resin composition is separated into an acetone-soluble fraction and an acetone-insoluble fraction, and their average compositions are determined by means of IR, from which the content of acrylonitrile unit in the acetone-soluble fraction and the content of acrylonitrile unit in the acetone-insoluble fraction, from which the rubbery polymer has been subtracted, are determined. Since the two results well coincided with each other, the composition of the acetone-soluble fraction could be expressed by the analyses of the products produced by the process of the polymerization.

a-7: The reaction of 1-a is repeated, except that the period of time for the addition of the monomer mixture and aqueous solution is shortened to 3 hours. When 1.5 hours has passed from the initiation of the polymerization, the polymerization rate is 84%. The final polymerization rate is 92.7%.

After-treatment, evaluation of the product and analyses are carried out in the same manner as in a-1. The production processes and results of 1-a to 1-7 are summarized in Table 1. Whether a resin composition is good or not good is judged in the following manner. Thus, in view of the properties required of automotive exterior trims, a resin composition having a melt flow rate of 15 gh/10 minutes or more and an Izod impact strength of 15 kg-cm/cm or more, showing no absorption of coating material and exhibiting a gloss vividness of coating surface of 45% or more is defined as a "good" resin composition.

As typical examples of the analysis of composition distribution, chromatograms of a-1 (example of this invention), a-7 (comparative example) and Example 5 (a preferred example of this invention mentioned in the following section) are shown in Table 5 and FIG. 2.

2. Blend synthesis of resin composition (method 1)

Graft copolymers (I) are synthesized in b-1 to b-4. Copolymers (II) are synthesized in c-1 to c-4. By blending graft copolymer (I) with copolymer (II), resin compositions are prepared.

b-1: Into a polymerization reactor equipped with a reflux condenser are charged 40 parts (weight of the solid component) of a polybutadiene rubber latex (0.3 micron), 100 parts of deionized water, 0.3 part of potassium rosinate and 0.2 part of t-dodecylmercaptan. After replacing the inner atmosphere with nitrogen gas, the temperature is elevated to 70° C. Then, a mixture consisting of 24 parts of acrylonitrile, 36 parts of styrene, 0.15 part of cumeme hydroperoxide and 0.4 part of t-dodecylmercaptan and an aqueous solution prepared by dissolving 0.3 part of sodium formaldehyde-sulfoxylate, 0.004 part of ferrous sulfate and 0.04 part of disodium salt of ethylene-diaminetetraacetic acid in 50 parts of deionized water ar continuously added and reacted over a period of 7 hours. During this period of time, the temperature of the polymerization system is maintained at 70° C. After the addition, an additional 0.02 part of cumeme hydroperoxide is added, and the reaction mixture is kept at a state of high activity for additional hour to complete the reaction. The latex thus obtained is made into dry flakes in the same manner as in a-1.

b-2 and b-3: In these experiments, the same reaction as in b-1 is carried out, except that composition of the monomer mixture and amount of t-dodecylmercaptan are altered. In b-4, the reaction of b-1 is repeated, except that the starting rubber latex differed from that of b-1 in particle diameter.

Table 2-1 summarizes the polymerization process, polymerization rate, degree of grafting, and content of acrylonitrile unit determined by IR.

c-1: Into a continuous, complete mixing type reactor which has previously been heated to 160° C., a monomer mixture consisting of 37.5 parts of acrylonitrile, 37.5 parts of styrene and 25 parts of ethylbenzene is continuously added and reacted, while discharging a quantity, equal to the quantity of fed monomer mixture, of polymer solution. After the solid content in the reaction system has been stabilized at a level of 50% by weight, the discharged polymer solution is deaerated, granulated and formed into sample pellets. c-2, c-3 and c-4: In c-2 and c-3, composition of the monomer mixture fed into reactor is altered. In c-4, a part of styrene is replaced with butyl acrylate.

Table 2-2 summarizes the polymerization process and acrylonitrile content in copolymer determined by IR.

The copolymers of b-1 to b-4 are blended with copolymers of c-1 to c-4 at the blending ratios shown in Table 2-3. After adding 0.2 part of antioxidant (BHT manufactured by Sumitomo Kagaku K.K.) and 0.5 part of mold release agent (ethylene-bisstearylamide), each composition is kneaded and pelletized by means of an extruder.

Coating performances and mechanical properties of the compositions are measured in the same manner as in a-1. The results are summarized in Table 2-3.

3. Blend synthesis of resin composition (method 2)

Graft copolymers (I) are synthesized in D-1 to D-7. Copolymers (II) are synthesized by emulsion polymerization in E-1 to E-9. Both materials are blended together to prepare resin compositions.

D-1: Into a polymerization reactor equipped with a reflux condenser are charged 60 parts (weight of solid component) of polybutadiene rubber latex (weight average particle diameter 0.15 micron) and 100 parts of deionized water. After replacing the inner atmosphere with nitrogen gas, the temperature is elevated to 70° C. To the latex, (1) a monomer mixture consisting of 14 parts of acrylonitrile, 26 parts of styrene, 0.3 part of t-dodecylmercaptan and 0.2 part of cumene hydroperoxide and (2) an aqueous solution prepared by dissolving 0.4 part of sodium formaldehyde-sulfoxylate, 0.004 part of ferrous sulfate and 0.04 part of disodium salt of ethylene-diaminetetraacetic acid in 50 parts of deionized water are continuously added and reacted over a time period of 5 hours. During this period, temperature of the polymerization system is kept at 70° C. After the addition, the reaction mixture is kept at a state of high activity for an additional 30 minutes to complete the reaction.

D-2 to D-7: In these experiments, the polymerization of D-1 is repeated, except that in the monomer composition, the amount of t-dodecylmercaptan and the particle diameter of the starting rubber latex are altered.

Table 3-1 summarizes the polymerization process and the results.

E-1: Into 170 parts of deionized water are dissolved 1.0 part of potassium alkenylsuccinate (LATEMUL ® ASK, manufactured by Kao Sekken K.K.) and 1.0 part of potassium rosinate. After adding 0.4 part of sodium formaldehyde-sulfoxylate, 0.004 part of ferrous sulfate and 0.04 part of disodium salt of ethylene diaminetetraacetic acid and replacing the gas phase with nitrogen gas, the temperature is elevated to 65° C. Into this aqueous solution, (1) a monomer mixture consisting of 35 parts of acrylonitrile, 65 parts of alpha-methylstyrene, 1.0 part of t-dodecylmercaptan and 0.5 part of cumene hydroperoxide and (2) an aqueous solution prepared by dissolving 0.6 part of sodium formaldehydesulfoxylate, 0.004 part of ferrous sulfate and 0.04 part of disodium salt of ethylene diaminetetraacetic acid in 80 parts of deionized water are continuously added and reacted over a period of 8 hours. When 2 hours has passed after the start of the addition, the polymerization rate exceeded 90%. Thereafter, a polymerization rate of 90% or higher is maintained. After the addition, the reaction mixture is kept at a state of high activity for an additional hour to complete the reaction. The final polymerization rate is 98.1%.

E-2 to E-11: In these experiments, the procedure of E-1 is repeated, except that the composition of the monomer mixture, the period and method of the continuous addition of the monomer mixture and aqueous solution, and the type and amount of emulsifier are altered.

The latexes thus formed are frozen to deposit the copolymer, and the deposited copolymer dried. The composition and composition distribution of the copolymer are measured by liquid chromatography.

The results of the production are summarized in Table 3-2.

Graft copolymer D and alpha-methylstyrene-containing copolymer E are blended together in a state of latexes so that the proportion thereof is 30:70 as expressed in terms of a solid component ratio. Thereafter, the blended mixture is pelletized in the same manner as in a-1. Test pieces are prepared therefrom by injection molding at a cylinder temperature of 20° C. and at a mold temperature of 60° C. Evaluation is then carried out in the same manner as in a-1.

The results are summarized in Table 3-3. In Examples 15 and 16, the blending ratio of graft copolymer D-1 to copolymer E-1 is altered to 20:80 and 40:60, respectively.

In Table 3—3, a resin composition is taken as a "good" resin composition when it has a melt flow rate of 3.0 or above and an Izod impact strength of 8.0 or above, and an absorption of the coating material did not occur, and gloss vividness of coating surface is 60% or higher.

3. Drying characteristics of resin composition

In the preparation of resin compositions a-1, a-2 and a-4, the number of washing treatments of salted out slurry is varied to prepare resin compositions F-1 to F-7, which are different from one another in the quantity of metal remaining in the resin. Further, in the composition (b−1)/(c−1) =42.5/57.5 corresponding to Example 5, the washing of the slurry is omitted in the production of (b−1), and this composition is referred to as F-8. Further, in the composition of (b−3)/(c−3) =45/55 corresponding to Example 10, the washing of the slurry is omitted in the production of (b-3), and this composition is referred to as F-9.

Compositions F-1 to F-9 are allowed to stand in a thermostatted bath (30° C., 100% humidity) for 5 days until the absorption of moisture has reached saturation. Each sample having absorbed moisture is dried under the conditions shown in Table 4 by means of a hot air circulation type oven. The oven has a sufficiently large capacity as compared with the quantity of sample. The samples are uniformly placed in the oven so as to have a thickness of 3 cm. Water contents in the water-absorbing samples and dry samples are measured with Karl Fischer water analyzer at an oven temperature of 250° C. At the same time, each sample is injection molded (cylinder temperature 240° C., mold temperature 45° C., no back pressure), and the occurrence of flash is visually examined. The results are summarized in Table 4.

TABLE 1

|  | Example 1 | Comparative Example 1 | Example 2 | Example 3 | Comparative Example 2 | Example 4 | Comparative Example 3 |
|---|---|---|---|---|---|---|---|
| Experiment No. | a-1 | a-2 | a-3 | a-4 | a-5 | a-6 | a-7 |
| Charged rubbery polymer (parts) | 16 | 16 | 16 | 16 | 16 | 20 | 16 |
| Additional acrylonitrile (parts) | 33.6 | 28.6 | 37.8 | 42.0 | 50.4 | 40.0 | 33.6 |
| Additional styrene (parts) | 50.4 | 55.4 | 46.2 | 42.0 | 33.6 | 24.0 | 50.4 |
| Additional butyl acrylate (parts) | 0 | 0 | 0 | 0 | 0 | 16.0 | 0 |
| Additional t-dodecylmercaptan (parts) | 0.85 | 0.7 | 1.0 | 1.3 | 1.6 | 1.3 | 0.85 |
| Addition time of monomers (hrs) | 6 | 6 | 6 | 6 | 6 | 6 | 3 |
| Polymerization rate (%) | 93.4 | 93.5 | 93.0 | 91.5 | 90.0 | 93.7 | 92.7 |
| Degree of grafting (%) | 54 | 60 | 50 | 45 | 43 | 48 | 50 |
| Av. acrylonitrile content in acetone-soluble fraction (% by mole) | 56.5 | 49.0 | 60.1 | 64.0 | 71.8 | 64.0 | 55.3 |
| Proportion of soluble fraction existing in the range (M ± 2.5%) (%) | 78.5 | 78.5 | 78.0 | 76.5 | 75.5 | 75.8 | 65.5 |
| Melt flow rate (JIS-K7210, 220° C., 10 Kg Load) | 24.4 | 30.1 | 24.2 | 15.4 | 2.8 | 17.9 | 20.3 |
| Izod impact strength (ASTM D256) | 23.3 | 18.9 | 30.5 | 19.6 | 37.3 | 73.9 | 21.5 |
| Absorption of coating material (visual examination) | − | + | − | − | − | − | − |
| Gloss vividness of coating surface | 45.6 | 18.6 | 47.8 | 52.5 | 43.3 | 60.8 | 23.3 |
| Overall evaluation | ○ | × | ○ | ○ | × | ○ | × |

−: No absorption noticeable
+: Absorption noticeable

TABLE 2-1

Copolymer (I)

|  | Graft Copolymer (I) No. | | | |
|---|---|---|---|---|
|  | b-1 | b-2 | b-3 | b-4 |
| Amount of charged rubbery polymer (parts) | 40 | 40 | 40 | 40 |
| Particle diameter of rubbery polymer (micron) | 0.3 | 0.3 | 0.3 | 0.15 |
| Additional acrylonitrile (parts) | 24 | 20.4 | 30 | 24 |
| Additional styrene (parts) | 36 | 39.6 | 30 | 36 |
| Additional t-dodecylmercaptan (parts) | 0.4 | 0.3 | 0.5 | 0.4 |
| Polymerization rate (%) | 96.5 | 97.3 | 95.0 | 97.0 |
| Degree of grafting (%) | 50.4 | 55.2 | 47.5 | 55.3 |
| Content of acrylonitrule unit (% by mole) | 55.2 | 49.3 | 63.0 | 55.5 |

TABLE 2-2

|  | Copolymer (II) No. | | | |
|---|---|---|---|---|
|  | c-1 | c-2 | c-3 | c-4 |
| Amount of acrylonitrile (parts) | 37.5 | 30 | 42 | 32.5 |
| Amount of styrene (parts) | 37.5 | 45 | 30 | 25 |
| Amount of butyl acrylate (parts) | 0 | 0 | 0 | 7.5 |
| Amount of ethylbenzene (parts) | 25 | 25 | 25 | 35 |
| Reaction temperature (°C.) | 160 | 160 | 160 | 150 |
| Average retention time (hrs) | 2 | 2 | 2 | 2 |
| Content of acrylonitrile unit (% by mole) | 56.7 | 50.3 | 63.5 | 56.5 |
| Content of butyl acrylate unit (% by mole) | 0 | 0 | 0 | 5.8 |

Note:
After polymer concentration in the polymerization system has reached a constant value of 50% by weight, the copolymer is taken out and used as the sample.

TABLE 2-3

|  | Example 5 | Example 6 | Example 7 | Example 8 | Example 9 | Comparative Example 4 |
|---|---|---|---|---|---|---|
| Formulation | | | | | | |
| Graft copolymer (I) No. | b-1 | b-1 | b-1 | b-1 | b-1 | b-2 |
| Acrylonitrile content in the component other than rubber (%) | 55.2 | 55.2 | 55.2 | 55.2 | 55.2 | 49.3 |
| Compounding ratio (%) | 42.5 | 50 | 60 | 45 | 50 | 45 |
| Copolymer (II) No. | c-1 | c-1 | c-1 | c-4 | c-4 | c-2 |
| Acrylonitrile content (%) | 56.7 | 56.7 | 56.7 | 56.5 | 56.5 | 50.3 |
| Compounding ratio (%) | 57.5 | 50 | 40 | 55 | 50 | 55 |
| Amount of rubber in resin composition (parts) | 17.4 | 20.4 | 24.5 | 18.3 | 20.4 | 18.3 |
| Av. acrylonitrile content in acetone-soluble fraction (%) | 56.0 | 55.5 | 55.0 | 55.8 | 56.0 | 49.8 |
| Proportion of (M) ± 2.5% by mole fraction (%) | 97.0 | 96.3 | 95.1 | 96.3 | 95.5 | 95.5 |
| Melt flow rate (JIS-K7210) | 26.0 | 22.0 | 15.3 | 24.1 | 21.4 | 12.5 |
| Izod impact strength (ASTM D256) | 16.0 | 20.0 | 30.0 | 32.1 | 35.5 | 29.4 |
| Absorption of coating material (visual) | − | − | − | − | − | + |
| Gloss vividness of coating (%) | 88.7 | 87.5 | 85.0 | 82.5 | 80.0 | 27.5 |
| Overall evaluation | ○ | ○ | ○ | ○ | ○ | × |

|  | Comparative Example 5 | Comparative Example 6 | Comparative Example 7 | Example 5 | Comparative Example 10 |
|---|---|---|---|---|---|
| Formulation | | | | | |
| Graft copolymer (I) No. | b-1 | b-3 | b-1 | b-3 | b-4 |
| Acrylonitrile content in the component other than rubber (%) | 55.2 | 63.0 | 55.2 | 63.0 | 55.5 |
| Compounding ratio (%) | 45 | 45 | 45 | 45 | 45 |
| Copolymer (II) No. | c-2 | c-2 | c-3 | c-3 | c-1 |
| Acrylonitrile content (%) | 50.3 | 50.3 | 63.5 | 63.5 | 56.7 |
| Compounding ratio (%) | 55 | 55 | 55 | 55 | 55 |
| Amount of rubber in resin composition (parts) | 18.3 | 12.6 | 18.3 | 18.6 | 18.3 |
| Av. acrylonitrile content | 52.2 | 54.5 | 61.2 | 63.5 | 56.3 |

TABLE 2-3-continued

|  |  |  |  |  |  |
|---|---|---|---|---|---|
| in acetone-soluble fraction (%) |  |  |  |  |  |
| Proportion of (M) ± 2.5% by mole fraction (%) | 67.0 | 10> | 5> | 91.1 | 97.5 |
| Melt flow rate (JIS-K7210) | 8.8 | 5.5 | 14.4 | 15.0 | 24.1 |
| Izod impact strength (ASTM D256) | 28.8 | 10.9 | 4.2 | 32.5 | 75 |
| Absorption of coating material (visual) | + | − | − | − | − |
| Gloss vividness of coating (%) | 24.5 | 30.1 | 50.5 | 82.1 | 90.3 |
| Overall evaluation | x | x | x | o | x |

−: No absorption noticeable
+: Absorption noticeable

TABLE 3-1

|  | Graft Copolymer (I) No. | | | | | | |
|---|---|---|---|---|---|---|---|
|  | D-1 | D-2 | D-3 | D-4 | D-5 | D-6 | D-7 |
| Amount of charged rubbery polymer (parts) | 60 | 60 | 60 | 60 | 60 | 60 | 60 |
| Particle diameter of rubbery polymer (micron) | 0.15 | 0.15 | 0.15 | 0.15 | 0.26 | 0.08 | 0.15 |
| Additional acrylonitrile (parts) | 14 | 16 | 20 | 10.8 | 14 | 14 | 14 |
| Additional styrene (parts) | 26 | 24 | 20 | 20.9 | 26 | 26 | 0 |
| Additional α-methylstyrene (parts) | 0 | 0 | 0 | 0 | 0 | 0 | 26 |
| Additional t-dodecylmercaptan (parts) | 0.3 | 0.3 | 0.3 | 0.3 | 0.3 | 0.3 | 0.3 |
| Polymerization rate (%) | 92.9 | 93.3 | 90.5 | 95.6 | 91.4 | 93.7 | 90.4 |
| Degree of grafting (%) | 48 | 51 | 55 | 45 | 44 | 42 | 40 |
| Content of acrylonitrile unit (% by mole) | 53.8 | 58.0 | 67.1 | 44.0 | 52.5 | 54.0 | 52.1 |

TABLE 3-2

|  | E-1 | E-2 | E-3 | E-4 | E-5 | E-6 | E-7 | E-8 | E-9 | E-10 | E-11 |
|---|---|---|---|---|---|---|---|---|---|---|---|
| Emulsifier (Table 3-2-2) | A | A | A | A | A | A | B | C | B | A | A |
| Initially charged α-methylstyrene (parts) | 0 | 0 | 0 | 0 | 0 | 65 | 0 | 0 | 0 | 0 | 0 |
| Additional α-methylstyrene (parts) | 65 | 65 | 65 | 60 | 60 | 0 | 65 | 65 | 65 | 50 | 73 |
| Additional acrylonitrile (parts) | 35 | 35 | 35 | 40 | 40 | 35 | 35 | 35 | 35 | 50 | 27 |
| Period of continuous addition (hrs) | 8 | 4 | 12 | 8 | 12 | 8 | 8 | 8 | 8 | 8 | 8 |
| Polymerization rate after 2 hrs. (%) | 90.5 | 87.4 | 91.3 | 90.0 | 91.0 | 91.1 | 43.5 | 94.5 | 54.2 | 88.5 | 95.1 |
| Final polymerization rate (%) | 98.1 | 97.3 | 78.5 | 96.9 | 97.3 | 97.5 | 90.9 | — | 93.3 | 94.9 | 99.9 |
| Content of acrylonitrile unit (% by mole) | 54.5 | 54.0 | 54.6 | 59.0 | 59.2 | 53.8 | 52.7 | — | 53.2 | 66.6 | 45.2 |
| Proportion of (M) ± 2.5% by mole fraction (%) | 72.1 | 63.5 | 79.0 | 70.5 | 75.3 | 58.1 | 60.2 | Viscosity increased | 63.0 | 68.5 | 91.5 |

Note

| Emulsifier | K rosinate | K alkenylsuccinate |
|---|---|---|
| A | 1.0 | 1.0 |
| B | 2.0 |  |
| C |  | 2.0 |
| D | 0.5 | 0.5 |

TABLE 3-3

|  | Ex.-11 | Ex.-12 | Ex.-13 | Ex.-14 | Ex.-15 | Ex.-16 | Comp.-9 | Comp.-10 | Comp.-11 |
|---|---|---|---|---|---|---|---|---|---|
| Graft copolymer (I) No. | D-1 | D-1 | D-2 | D-2 | D-1 | D-1 | D-1 | D-1 | D-1 |
| Content of acrylonitrile unit (% by mole) | 53.8 | 53.8 | 58.0 | 58.0 | 53.8 | 53.8 | 53.8 | 53.8 | 53.8 |
| Copolymer (II) No. | E-1 | E-3 | E-4 | E-5 | E-1 | E-1 | E-2 | E-6 | E-7 |
| Content of acrylonitrile unit (% by mole) | 54.5 | 54.6 | 59.0 | 59.2 | 54.5 | 54.5 | 54.0 | 53.8 | 52.9 |
| Amt. of rubbery in resin composition (parts) | 18 | 18 | 18 | 18 | 12 | 24 | 18 | 18 | 18 |
| Av. acrylonitrile unit content in acetone-soluble fraction (% by mole) | 54.0 | 53.6 | 58.5 | 58.5 | 54.5 | 53.5 | 52.5 | 53.1 | 52.9 |
| Proportion of (M) ± 2.5% fraction (%) | 70.5 | 76.8 | 70.5 | 75.0 | 71.8 | 70.0 | 60.3 | 60.1 | 62.1 |
| Melt flow rate (JIS K7210) | 5.2 | 6.8 | 4.6 | 5.1 | 8.5 | 3.3 | 4.8 | 3.3 | 3.5 |
| Izod impact strength (ASTM D256) | 12.2 | 11.7 | 12.6 | 12.0 | 9.5 | 15.1 | 13.1 | 7.0 | 10.5 |
| Heat distortion temp. (ASTM D648) | 101.5 | 101.3 | 100.2 | 100.1 | 102.7 | 98.3 | 101.7 | 104.4 | 102.4 |
| Absorption of coating material* | − | − | − | − | − | − | − | + | − |
| Gloss vividness of coating (%) | 67.7 | 81.0 | 70.3 | 84.5 | 70.5 | 65.5 | 42.1 | 25.3 | 33.8 |
| Overall evaluation | o | o | o | o | o | o | x | x | x |

|  | Comp.-12 | Comp.-13 | Comp.-14 | Comp.-15 | Comp.-16 | Comp.-17 | Ex.-17 |
|---|---|---|---|---|---|---|---|
| Graft copolymer (I) No. | D-1 | D-3 | D-4 | D-5 | D-6 | D-4 | D-7 |
| Content of acrylonitrile unit (% by mole) | 58.0 | 67.1 | 44.0 | 52.5 | 54.0 | 44.0 | 52.1 |
| Copolymer (II) No. | E-9 | E-10 | E-11 | E-1 | E-1 | E-3 | E-1 |
| Content of acrylonitrile unit (% by mole) | 53.2 | 66.6 | 45.2 | 54.5 | 54.0 | 54.6 | 54.5 |
| Amt. of rubbery in resin composition (parts) | 18 | 18 | 18 | 18 | 18 | 18 | 18 |
| Av. acrylonitrile unit content in acetone-soluble fraction (% by mole) | 53.0 | 66.0 | 44.5 | 54.0 | 54.4 | 42.5 | 54.6 |
| Proportion of (M) ± 2.5% fraction (%) | 64.5 | 65.4 | 87.7 | 70.9 | 72.0 | 72.0 | 75.3 |
| Melt flow rate (JIS K7210) | 4.2 | 1.8 | 2.7 | 5.6 | 4.9 | 7.3 | 4.5 |
| Izod impact strength (ASTM D256) | 11.3 | 11.5 | 10.1 | 6.5 | 5.3 | 9.5 | 11.8 |
| Heat distortion temp. (ASTM D648) | 101.7 | 78.7 | 105.0 | 101.3 | 102.0 | 101.0 | 102.5 |
| Absorption of coating material* | − | − | + | − | − | + | − |

TABLE 3-3-continued

| | | | | | | | |
|---|---|---|---|---|---|---|---|
| Gloss vividness of coating (%) | 39.5 | 75.5 | 13.2 | 41.7 | 70.5 | 53.1 | 80.4 |
| Overall evaluation | x | x | x | x | x | x | o |

Ex: Example
Comp: Comparative Example
*—: No absorption noticeable
+: Absorption noticeable

TABLE 4

| Experiment No. | Starting resin composition | Average acrylonitrile content in acetone-soluble fraction | Number of reslurrying treatments | Na + K (ppm) | Drying temp. (°C.) | Saturated moisture absorption (ppm) |
|---|---|---|---|---|---|---|
| Comp-18 | F-1 | a-2 | 49.0 (mol %) | 0 | 150 | 80 90 | 8000 |
| Comp-19 | F-2 | a-1 | 56.4 (mol %) | 0 | 160 | 90 | 9600 |
| Ex-18 | F-3 | | | 1 | 114 | 80 90 | 10100 |
| Ex-19 | F-4 | | | 2 | 57 | 80 90 | 8600 |
| Comp-20 | F-5 | a-4 | 64.0 (mol %) | 0 | 167 | 90 | 13300 |
| Ex-20 | F-6 | | | 2 | 60 | 80 90 | 12000 |
| Ex-21 | F-7 | | | 3 | 26 | 80 90 | 10300 |
| Ex-22 | F-8 | (b-1)/(c-1) = 42.5/57.5 | 56.0 (mol %) | 0 | 60 | 80 90 | 9000 |
| Ex-23 | F-9 | (b-3)/(c-3) (45/55) | 63.5 (mol %) | 0 | 65 | 80 90 | 12800 |

| Experiment No. | After drying for 2 hrs. | | | After drying for 4 hrs. | | After drying for 10 hrs. | |
|---|---|---|---|---|---|---|---|
| | Moisture (ppm) | Flash | Absorption of coating material | Moisture (ppm) | Flash | Moisture (ppm) | Flash |
| Comp-18 | 900 | — | + | / | / | / | / |
| | 500 | — | + | / | / | / | / |
| Comp-19 | 2900 | + | — | 1,900 | + | 1,250 | + |
| Ex-18 | 2300 | + | — | 1,400 | + | 940 | — |
| | 1500 | + | — | 880 | — | / | / |
| Ex-19 | 1100 | + | — | 840 | — | / | / |
| | 570 | — | — | / | / | / | / |
| Comp-20 | 5000 | + | — | 3,100 | + | 1,700 | + |
| Ex-20 | 3100 | + | — | 1,600 | + | 880 | — |
| | 2200 | + | — | 940 | — | / | / |
| Ex-21 | 1600 | + | — | 880 | — | / | / |
| | 1000 | + | — | 540 | — | / | / |
| Ex-22 | 1400 | + | — | 900 | — | / | / |
| | 650 | — | — | / | / | / | / |
| Ex-23 | 4000 | + | — | 2,300 | + | 910 | — |
| | 2500 | + | — | 950 | — | / | / |

Ex: Example
Comp: Comparative Example
+: Noticeable
—: Unnoticeable
/: Not measured

TABLE 5

| | Example 1 | Comparative Example 3 | Example 3 |
|---|---|---|---|
| Resin composition No. | a-1 | a-7 | (b-1) + (c-1) |
| Av. content of acrylonitrile (% by mole) | 56.5 | 55.3 | 56.0 |
| Proportion of (M) ± 2.5% fraction (%) | 78.5 | 65.5 | 97.0 |

The resin composition of this invention exhibits the following effects:

(1) The resin composition of this invention is excellent in flow property during processing and in impact resistance property, and it has an excellent appearance and coating performance.

(2) When used as a plating material, it forms a plating surface having a high gloss vividness, owing to its excellent chemical resistance property. The plating film is resistant to peeling when contacted with chemicals such as gasoline, brake oil, etc.

(3) It is resistant to the migration of vinyl chloride resin plasticizers such as dioctyl adipate and the like. Accordingly, it shows no decrease in strength, when used in an environment in which it would come into contact with vinyl cloride resin.

(4) Further, it is excellent in resistance to Freon gases used for foaming urethane resin. Accordingly, it is usable as a core material or skin material resistant to direct foaming of a urethane resin.

(5) In addition to chemical resistance, it also has a high light resistance. Thus, it is not susceptible to discoloration caused by light and exhibits a high retention of mechanical strength. Accordingly, the field to which ABS resin is applicable, can be broaden by its use.

What is claimed is:

1. A resin composition comprising graft copolymer (I) prepared by graft-copolymerizing a vinyl cyanide monomer and an aromatic vinyl monomer onto a rubbery polymer and a copolymer (II) prepared by copolymerizing a vinyl cyanide monomer and an aromatic vinyl monomer, wherein:
  (i) content of the rubbery polymer in said resin composition is 5 to 50% by weight,
  (ii) average content (M) of vinyl cyanide monomer in the acetone-soluble fraction (P) of said resin composition is 50 to 65% by mole,
  (iii) (M) of the vinyl cyanide monomer of (I) is substantially equal to the average vinyl cyanide monomer content of (II), and
  (iv) in a composition distribution chart, at least 70% by weight of (P) exists in the range of (M) ±2.5% by mole.

2. The resin composition according to claim 1, wherein a part of the aromatic vinyl monomer constituting (I) and/or (II) is replaced with an acrylic ester monomer or a methacrylic ester monomer in the amount of 5 to 50% by weight based on the quantity of aromatic vinyl monomer before the replacement.

3. The resin composition according to claim 1, wherein said vinyl cyanide monomer constituting (I) and/or (II) is acrylonitrile.

4. The resin composition according to claim 1, wherein said aromatic vinyl monomer constituting (I) and/or (II) is styrene.

5. The resin composition according to claim 1, wherein a part or the total amount of said aromatic vinyl monomer constituting (I) and/or (II) is alphamethylstyrene.

6. The resin composition according to claim 2 wherein said acrylic ester monomer or methacrylic ester monomer is butyl acrylic ester monomer or butyl methacrylic ester monomer.

7. The resin composition according to claim 1, 2, 3 or 4, wherein said rubbery polymer has a particle diameter of 0.2 to 0.4 micron.

8. The resin composition according to claim 5, wherein said rubbery polymer has a particle diameter of 0.1 to 0.2 micron.

9. The resin composition according to claim 1, 2, 3, 4, 5 or 8, wherein the sum quantity of sodium and potassium present in the resin composition is 150 ppm or less when (M) is 50% by mole and is 60 ppm or less when (M) is 65% by mole, based on the area ABCD of FIG. 1.

10. The resin composition according to claim 6, wherein the sum quantity of sodium and potassium present in the resin composition is 150 ppm or less when (M) is 50% by mole and 60 ppm or less when (M) is 65% by mole, based on the area ABCD of FIG. 1.

11. The resin composition according to claim 7, wherein the sum quantity of sodium and potassium present in the resin composition is 150 ppm or less when (m) is 50% by mole and 60 ppm or less when (M) is 65% by mole, based on the area ABCD of FIG. 1.

12. A resin composition having a sharp composition distribution, prepared by blending a graft-copolymer (I) which comprises a vinyl cyanide monomer and an aromatic vinyl monomer grafted onto a rubber polymer,
  wherein said graft-copolymer (I) is produced by a process comprising, charging the rubbery copolymer into a polymerization reactor in the form of a latex, and thereafter continuously adding and graft-copolymerizing a monomer mixture comprising a vinyl cyanide monomer and an aromatic vinyl monomer, onto the rubbery polymer, while maintaining a graft-copolymerization rate of 90% or above during at least ¾ of the period of the total addition time,
  with a copolymer which comprises a vinyl cyanide monomer and an alpha-methylstyrene,
  wherein said copolymer is produced by an emulsion polymerization process comprising forming a reaction mixture comprising a vinyl cyanide monomer and an alpha-methylstyrene monomer mixture, and an emulsifier mixture consisting of a 3:7 to 7:3 of potassium or sodium rosinate and potassium or sodium salt of an alkenylsuccinic acid, in an amount of 1.5 to 3 parts by weight per 100 parts by weight of the total monomer mixture, and continuously adding and reacting the reaction mixture, and maintaining a polymerization rate of 90% or above during at least ¾ of the period of the total addition time, wherein
  (i) content of the rubbery polymer in said resin composition is 5 to 50% by weight,
  (ii) average content (M) of vinyl cyanide monomer in the acetone-soluble fraction (P) of said resin composition is 50 to 65% by mole,
  (iii) (M) of the vinyl cyanide monomer of (I) is substantially equal to the average vinyl cyanide monomer content of (II), and
  (iv) in a composition distribution chart, at least 70% by weight of (P) exists in the range of (M) ±2.5% by mole.

13. The resin composition according to claim 6, wherein said rubbery polymer has a particle diameter of 0.2 to 0.4 micron.

14. A resin composition comprising a blend of graft copolymer (I) which comprises a vinyl cyanide monomer and an aromatic vinyl monomer grafted onto a rubbery polymer and copolymer (II) which comprises a vinyl cyanide monomer and an aromatic vinyl monomer, wherein:
  (i) content of the rubbery polymer in said resin composition is 5 to 50% by weight,
  (ii) average content (M) of vinyl cyanide monomer in the acetone-soluble fraction (P) of said resin composition is 50 to 65% by mole,
  (iii) (M) of the vinyl cyanide monomer of (I) is substantially equal to the average vinyl cyanide monomer content of (II), and
  (iv) in a composition distribution chart, at least 70% by weight of (P) exists in the range of (M) ±2.5% by mole, and wherein
  said blend is produced by a process comprising, charging a rubbery copolymer latex comprising potassium rosinate into a polymerization reactor in the form of a latex, elevating the temperature to about 70° C. and thereafter continuously adding to the latex (1) a monomer mixture comprising a vinyl cyanide monomer and an aromatic vinyl monomer and (2) an aqueous solution which comprises sodium formaldehyde sulfoxylate, ferrous sulfate and disodium salt of ethylenediaminetetraacetic acid to form a reaction mixture and reacting the reaction mixture to produce said blend.

15. The resin composition according to claim 1, wherein the respective contents of the acetone-soluble and acetone-insoluble fractions contained in the composition are 15-93.5% by weight and 6.5-85% by weight.

16. The resin composition according to claim 12, wherein the respective contents of the acetone-soluble and acetone-insoluble fractions contained in the composition are 15-93.5% by weight and 6.5-85% by weight.

17. The resin composition according to claim 14, wherein the respective contents of the acetone-soluble and acetone-insoluble fractions contained in the composition are 15-93.5% by weight and 6.5-85% by weight.

* * * * *